United States Patent
Chen et al.

(10) Patent No.: US 11,029,172 B2
(45) Date of Patent: Jun. 8, 2021

(54) REAL SCENARIO NAVIGATION METHOD AND APPARATUS, DEVICE AND COMPUTER READABLE STORAGE MEDIUM

(71) Applicant: BAIDU ONLINE NETWORK TECHNOLOGY (BEIJING) CO., LTD., Beijing (CN)

(72) Inventors: Xintao Chen, Beijing (CN); Zhipeng Zhou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 237 days.

(21) Appl. No.: 16/344,950

(22) PCT Filed: Dec. 27, 2017

(86) PCT No.: PCT/CN2017/118857
§ 371 (c)(1),
(2) Date: Apr. 25, 2019

(87) PCT Pub. No.: WO2019/000880
PCT Pub. Date: Jan. 3, 2019

(65) Prior Publication Data
US 2019/0271557 A1  Sep. 5, 2019

(30) Foreign Application Priority Data
Jun. 29, 2017 (CN) .......................... 201710516794.0

(51) Int. Cl.
*G01C 21/36* (2006.01)
*G01C 21/34* (2006.01)

(52) U.S. Cl.
CPC ....... *G01C 21/3647* (2013.01); *G01C 21/343* (2013.01); *G01C 21/3423* (2013.01);
(Continued)

(58) Field of Classification Search
CPC .............. G01C 21/3647; G01C 21/343; G01C 21/3626; G01C 21/3608; G01C 21/3605;
(Continued)

(56) References Cited

U.S. PATENT DOCUMENTS

| 8,738,284 B1 | 5/2014 | Jones | |
| 2014/0365113 A1* | 12/2014 | McGavran | G01C 21/3661 701/425 |

(Continued)

FOREIGN PATENT DOCUMENTS

| CN | 101470004 A | 7/2009 |
| CN | 101762279 A | 6/2010 |

(Continued)

OTHER PUBLICATIONS

First Office action and search report from CN app. No. 201710516794.0, dated Jun. 28, 2019, with English translation from Global Dossier.

(Continued)

*Primary Examiner* — Russell Frejd
(74) *Attorney, Agent, or Firm* — Ladas & Parry, LLP

(57) ABSTRACT

The present disclosure provides a real scenario navigation method and apparatus, a device and a computer readable storage medium. In the embodiments of the present disclosure, it is feasible to obtain the travel manner, the query starting point, the query finishing point and the destination provided by the user, and then perform navigation map-based first travel manner path planning, according to the travel manner, the query starting point and the query finishing point so that it is feasible to perform real-scenario image-based second travel manner path planning, according to the query finishing point and the destination, if the user reaches the query finishing point and a distance between the query finishing point and the destination is smaller than or (Continued)

equal to a preset distance threshold. Since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, thereby improving navigation efficiency and reliability.

15 Claims, 2 Drawing Sheets

(52) U.S. Cl.
CPC ..... *G01C 21/3605* (2013.01); *G01C 21/3608* (2013.01); *G01C 21/3626* (2013.01); *G01C 21/3629* (2013.01)

(58) Field of Classification Search
CPC . G01C 21/3423; G01C 21/3629; G01C 21/20
See application file for complete search history.

(56) References Cited

U.S. PATENT DOCUMENTS

| | | | | |
|---|---|---|---|---|
| 2015/0323340 | A1* | 11/2015 | McGavran | G01C 21/3423 701/425 |
| 2016/0153789 | A1* | 6/2016 | Gallar | G01C 21/3635 701/408 |
| 2016/0265935 | A1 | 9/2016 | Ma | |
| 2016/0356622 | A1* | 12/2016 | McGavran | G01C 21/3667 |
| 2017/0074669 | A1* | 3/2017 | Newlin | G01C 21/3423 |
| 2017/0359695 | A1* | 12/2017 | Aerts | H04W 64/00 |

FOREIGN PATENT DOCUMENTS

| | | | |
|---|---|---|---|
| CN | 102102993 | A | 6/2011 |
| CN | 103674016 | A | 3/2014 |
| CN | 104864879 | A | 8/2015 |
| CN | 104990556 | A | 10/2015 |
| CN | 106525065 | A | 3/2017 |
| CN | 106540409 | A | 3/2017 |
| CN | 106874436 | A | 6/2017 |
| CN | 107478237 | A | 12/2017 |
| JP | 2005257622 | A | 9/2005 |

OTHER PUBLICATIONS

Second Office action from CN app. No. 201710516794.0, dated Sep. 4, 2019, with English translation from Global Dossier.
Written Opinion of the International Searching Authority from PCT/CN2017/118857, dated Apr. 3, 2018.
International Preliminary Report on Patentability from PCT/CN2017/118857, dated Dec. 31, 2019.
International Search Report for PCT/CN2017/118857 dated Apr. 3, 2018 and its English translation provided by WIPO.
Written Opinion of the International Search Authority for PCT/CN2017/118857 dated Apr. 3, 2018 and its English translation provided by Google Translate.
Extended European Search Report from EP app. No. 17915614.6, dated Jun. 10, 2016.

* cited by examiner

REAL SCENARIO NAVIGATION METHOD AND APPARATUS, DEVICE AND COMPUTER READABLE STORAGE MEDIUM

CROSS-REFERENCE TO RELATED APPLICATIONS

The present application is the U.S. national phase of PCT Application No. PCT/CN2017/118857 filed on Dec. 27, 2017, which claims priority to the Chinese Patent Application No. 201710516794.0 entitled "REAL SCENARIO NAVIGATION METHOD AND APPARATUS, DEVICE AND COMPUTER READABLE STORAGE MEDIUM" filed on the filing date Jun. 29, 2017, the entire disclosures of which are hereby incorporated by reference in their entireties.

FIELD OF THE DISCLOSURE

The present disclosure relates to path planning technologies, and particularly to a real scenario navigation method and apparatus, a device and a computer readable storage medium.

BACKGROUND OF THE DISCLOSURE

As communication technologies develop, terminals integrate more and more functions so that system function lists of the terminals include more and more corresponding applications (APPs). Some applications involve some Location Based Service (LBS), also called positioning service, for example, Baidu Map, Baidu Navigation and Autonavi Navigation.

In LBS, applications related to location based service first display a location service interface to a user so that the user performs input, and then may, according to information input by the user, set information such as a query starting point and a query finishing point, and request a query engine to provide a navigation path.

However, since navigation operations are performed completely depending on the query starting point and query finishing point, the obtained navigation information might not satisfy the user's real travel intention. For example, the query finishing point is not the user's final destination; after reaching the query finishing point, the user might further need to switch to another travel manner such as an on-foot manner and then further perform the navigation operations again, thereby causing reduction of efficiency and reliability of the navigation.

SUMMARY OF THE DISCLOSURE

A plurality of aspects of the present disclosure provide a real scenario navigation method and apparatus, a device and a computer readable storage medium, to improve navigation efficiency and reliability.

According to an aspect of the present disclosure, there is provided a real scenario navigation method, comprising:

obtaining a travel manner, a query starting point, a query finishing point and a destination provided by a user;

performing navigation map-based first travel manner path planning, according to the travel manner, the query starting point and the query finishing point;

if the user reaches the query finishing point and a distance between the query finishing point and the destination is smaller than or equal to a preset distance threshold, performing real-scenario image-based second travel manner path planning, according to the query finishing point and the destination.

The above aspect and any possible implementation mode further provide an implementation mode: the first travel manner comprises cycling, public transport, subway or self drive; the second travel manner comprises walling on foot or cycling.

The above aspect and any possible implementation mode further provide an implementation mode: the performing real-scenario image-based second travel manner path planning, according to the query finishing point and the destination comprises:

using an image-collecting device to collect real-scenario images around a location where the user lies;

performing navigation map-based second travel manner path planning, according to the query finishing point and the destination; and outputting a planning result of the second travel manner path planning based on the real-scenario images around the location where the user lies.

The above aspect and any possible implementation mode further provide an implementation mode: the planning result of the second travel manner path planning comprises at least one of the following information:

direction indication information indicating the current travel direction; and distance indication information indicating a distance between the location where the user lies and the destination and/or time indication information indicating time between the location where the user lies and the destination.

The above aspect and any possible implementation mode further provide an implementation mode: the outputting a planning result of the second travel manner path planning based on the real-scenario images around the location where the user lies comprises:

outputting the planning result of the second travel manner path planning in a speech manner and/or a text manner based on real-scenario images around the location where the user lies.

The above aspect and any possible implementation mode further provide an implementation mode: before the step of, if the user reaches the query finishing point and a distance between the query finishing point and the destination is smaller than or equal to a preset distance threshold, performing real-scenario image-based second travel manner path planning, according to the query finishing point and the destination, the method further comprises:

presetting the distance threshold according to attribute information of the destination.

According to another aspect of the present disclosure, there is provided a real scenario navigation apparatus, comprising:

an obtaining unit configured to obtain a travel manner, a query starting point, a query finishing point and a destination provided by a user;

a planning unit configured to perform navigation map-based first travel manner path planning, according to the travel manner, the query starting point and the query finishing point;

the planning unit is further configured to, if the user reaches the query finishing point and a distance between the query finishing point and the destination is smaller than or equal to a preset distance threshold, perform real-scenario image-based second travel manner path planning, according to the query finishing point and the destination.

The above aspect and any possible implementation mode further provide an implementation mode: the first travel manner comprises cycling, public transport, subway or self drive; the second travel manner comprises walling on foot or cycling.

The above aspect and any possible implementation mode further provide an implementation mode: the planning unit is specifically configured to use an image-collecting device to collect real-scenario images around a location where the user lies;

perform navigation map-based second travel manner path planning, according to the query finishing point and the destination; and output a planning result of the second travel manner path planning based on the real-scenario images around the location where the user lies.

The above aspect and any possible implementation mode further provide an implementation mode: the planning result of the second travel manner path planning comprises at least one of the following information:

direction indication information indicating the current travel direction; and distance indication information indicating a distance between the location where the user lies and the destination and/or time indication information indicating time between the location where the user lies and the destination.

The above aspect and any possible implementation mode further provide an implementation mode: the planning unit is specifically configured to:

output the planning result of the second travel manner path planning in a speech manner and/or a text manner based on real-scenario images around the location where the user lies.

The above aspect and any possible implementation mode further provide an implementation mode: the planning unit is further configured to preset the distance threshold according to attribute information of the destination.

According to a further aspect of the present disclosure, there is provided a device, comprising one or more processor;

a storage for storing one or more programs, said one or more programs, when executed by said one or more processors, enable said one or more processors to implement the real scenario navigation method according to the above first aspect.

According to a further aspect of the present disclosure, there is provided a computer readable storage medium on which a computer program is stored, wherein the program, when executed by a processor, implements the real scenario navigation method according to the above first aspect.

As known from the above technical solutions, in the embodiments of the present disclosure, it is feasible to obtain the travel manner, the query starting point, the query finishing point and the destination provided by the user, and then perform navigation map-based first travel manner path planning, according to the travel manner, the query starting point and the query finishing point so that it is feasible to perform real-scenario image-based second travel manner path planning, according to the query finishing point and the destination, if the user reaches the query finishing point and a distance between the query finishing point and the destination is smaller than or equal to a preset distance threshold. Since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, thereby improving navigation efficiency and reliability.

In addition, when the technical solution according to the present disclosure is employed, since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, which can effectively avoid the technical problem in the prior art that data interaction between the application and the query engine increases because the application repeatedly performs query operations, and thereby reduce the processing burden of the query engine.

In addition, the technical solution according to the present disclosure can be employed to effectively improve the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
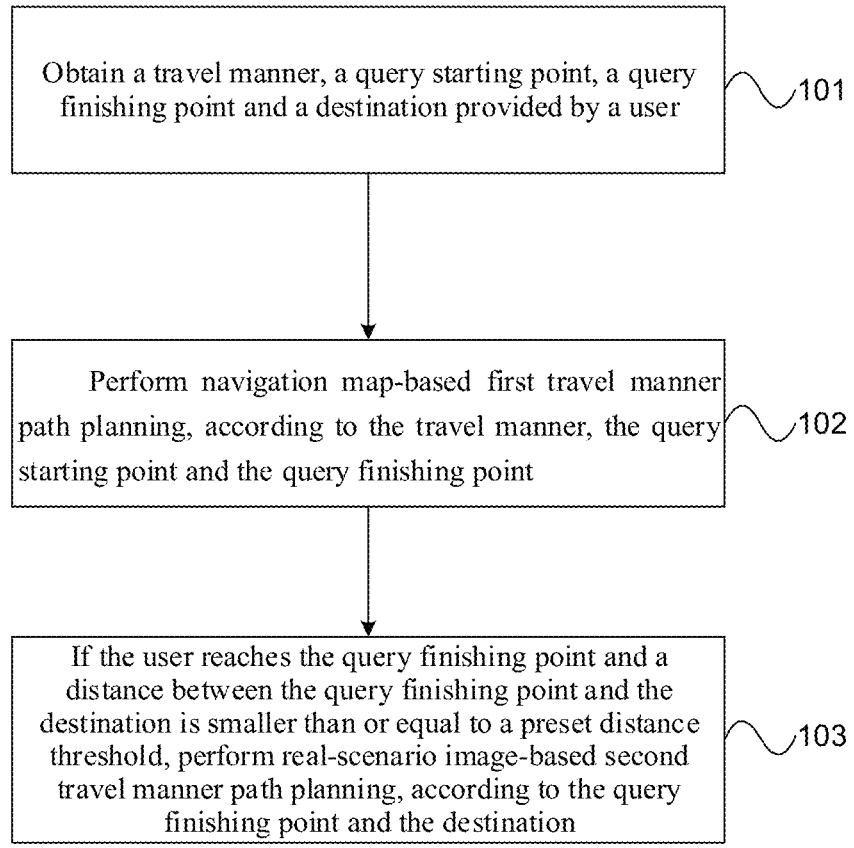
FIG. 1 is a flow chart of a real scenario navigation method according to an embodiment of the present disclosure.

FIG. 1 is a flow chart of a real scenario navigation method according to an embodiment of the present disclosure. As shown in FIG. 1, the method comprises the following steps:

101: obtaining a travel manner, a query starting point, a query finishing point and a destination provided by a user.

The travel manner may refer to a travel manner other than an on-foot manner, and may include but not limited to one of the following manners:

cycling;
public transport;
subway; or
self drive.

The query starting point may be the user's query departure location, or a location where the user lies, and is not particularly limited in the present embodiment.

The query finishing point may be a termination location of the user's query, or a location passed by the user's query, and is not particularly limited in the present embodiment.

The destination may be a location where the user really wants to go, or a location that the user actually passes, and is not particularly limited in the present embodiment.

102: performing navigation map-based first travel manner path planning, according to the travel manner, the query starting point and the query finishing point.

The so-called navigation map is short for an electronic map and is a map stored and viewed in a digital manner with computer technologies. From the perspective of the form of composition, the navigation map is comprised of roads, background, annotations and Points of Interest (POI). Certainly, the navigation map may further include many special contents such as 3D crossing real-scenario enlarged views and 3D buildings.

103: if the user reaches the query finishing point and a distance between the query finishing point and the destination is smaller than or equal to a preset distance threshold, performing real-scenario image-based second travel manner path planning, according to the query finishing point and the destination.

It needs to be appreciated that a subject for executing 101-103 may be an application located at a local terminal, or a function unit such as a plug-in or Software Development Kit (SDK) arranged in the application located at the local terminal, or a query engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, it is feasible to obtain a travel manner, a query starting point, a query finishing point and a destination provided by a user, and then perform navigation map-based first travel manner path planning, according to the travel manner, the query starting point and the query finishing point so that it is feasible to perform real-scenario image-based second travel manner path planning, according to the query finishing point and the destination, if the user reaches the query finishing point and a distance between the query finishing point and the destination is smaller than or equal to a preset distance threshold. Since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, thereby improving navigation efficiency and reliability.

In the present embodiment, the user wants to use the user-input travel manner, query starting point, query finishing point and destination, for example, the travel manner is self drive, the query starting point is the location where the user lies or a designated location, the query finishing point is a gate of a park, and the destination is an amusement facility in the park. The user wants to use the above information to query for path navigation information corresponding to the query starting point and query finishing point in the travel manner, and after reaching the query finishing point, further query for real-scenario navigation information corresponding to the query finishing point and the destination in another travel manner such as an on-foot manner according to the query finishing point and the destination.

Usually, some applications involve some location-based services, for example, Baidu Map. These applications first display a location service interface to the user for the user to input information, then may, according to information input by the user, set information of query end points such as the query starting point and the query finishing point, and thereby request a query engine to provide a matched navigation path. Optionally, in a possible implementation mode of the present embodiment, in 102, it is specifically feasible to collect query keywords, also called query data, provided by the user.

Optionally, in a possible implementation mode of the present embodiment, in 101, it is specifically feasible to collect the query keywords provided by the user, namely, the travel manner, the query starting point, the query finishing point and destination, also called query data, which can be implemented by a query command triggered by the user. It is specifically possible to trigger the query command in the following manners:

Manner 1:

The user may input the query keywords on a page presented by the current application. The query keywords may include the travel manner, the query starting point, the query finishing point and the destination. Then, the query command is triggered by clicking a query button on the page, for example, a navigation control provided by Baidu Map application, and the query command includes the query keywords. As such, after the query command is received, the query keywords included therein may be obtained by parsing.

Manner 2:

It is feasible to employ an asynchronous loading technology such as Ajax asynchronous loading or Jsonp asynchronous loading to obtain, in real time, contents input by the user on the page presented by the current application. To distinguish from the query keywords, the input contents at this time may be called input keywords. Then, the query command is triggered by clicking a query button on the page, for example, a navigation control provided by Baidu Map application, or by successfully obtaining one input character. The query command includes the query keywords. As such, after the query command is received, the query keywords included therein may be obtained by parsing.

Specifically, it is feasible to provide an interface such as an Ajax interface or Jsonp interface. These interfaces may write by using a language such as Java or Hypertext Preprocessor (PHP) language, and their specific invocation may be written by using Jquery, or a native language such as JavaScript.

Manner 3: the user may long-press a speech query button on the page presented by the current application, speak speech content to be input, and then release the speech query button to trigger the query command The query command includes query keywords in a text form converted from the spoken speech content. As such, after the query command is received, the query keywords included therein may be obtained by parsing.

Manner 4: the user may click a speech query button on the page presented by the current application, speak speech content to be input, and trigger the query command after a period of time, e.g., 2 seconds after completion of the speaking of the speech content. The query command includes query keywords in a text form converted from the spoken speech content. As such, after the query command is received, the query keywords included therein may be obtained by parsing.

In most cases, the user's query purpose might be random or not specific so that the query starting point and query finishing point included in the query data provided by the user might be uncertain to a certain degree. Therefore, it is feasible to perform proper expansion processing for the query starting point and query finishing point included in by query data to expand a scope of the query starting point and query finishing point of the query of this time so that the query starting point is no longer limited to the user-provided query starting point, and the query finishing point is no longer limited to the user-provided query finishing point. As such, the query result can be enabled to better meet the user's real travel intention.

Optionally, in a possible implementation mode of the present embodiment, the first travel manner may be determined by the user-provided travel manner, i.e., the user-provided travel manner is the first travel manner; the second travel manner may be determined according to attribute information of the destination, for example, if the destination is a classroom or a library on a campus of a university, the second travel manner may be an on-foot manner or cycling manner; if the destination is a scenic spot in a park, the second travel manner may be an on-foot manner.

Optionally, in a possible implementation mode of the present embodiment, in 103, it is specifically feasible to use an image-collecting device to collect real-scenario images around a location where the user lies, and thereby perform navigation map-based second travel manner path planning, according to the query finishing point and the destination. Then, it is feasible to output a planning result of the second travel manner path planning based on the real-scenario images around the location where the user lies.

Wherein the image-collecting device may be a camera of a terminal used by the user, and may specifically be a Charge Coupled Device (CCD) sensor or a Complementary Metal-Oxide Semiconductor (CMOS) sensor, and is not particularly limited in the present embodiment.

If it is detected that the current light is dim, it is feasible to perform supplemental lighting processing for the collected target object, namely, the scene around the location where the user lies, for example, activate a Light Emitting diode (LED) to supplement light.

In this implementation mode, the planning result of the navigation map-based second travel manner path planning according to the query finishing point and the destination may include but not limited to at least one of the following information:

direction indication information indicating the current travel direction, for example, travel straight forward, turn left or turn right; and distance indication information indicating a distance between the location where the user lies and the destination and/or time indication information indicating time between the location where the user lies and the destination, for example, X X meters left in the whole trip, need to spend X X minutes.

Specifically, the location where the user lies may be specifically obtained according to the user's positioning data. To so-called user's positioning data may specifically be the user's positioning result, namely, geographical location data of the location where the user lies, obtained by the user-used terminal by employing various current positioning technologies, for example, Global Positioning System technology, Wireless Fidelity (WIFI) positioning technology or base station positioning technology. This is not particularly limited in the present embodiment.

In a possible implementation, it may be specifically feasible to output the planning result of the second travel manner path planning in a speech manner and/or a text manner based on real-scenario images around the location where the user lies.

Optionally, in a possible implementation mode of the present embodiment, before 103, the method may further comprise presetting the distance threshold according to attribute information of the destination.

For example, the distance threshold may be preset according to an area range to which the destination belongs. The larger the area range is, the larger the distance threshold is; the smaller the area range is, the smaller the distance threshold is.

Or, again for example, the distance threshold may be preset according to a type of the destination. If the type is a scenic spot for tourism, the distance threshold is larger; if the type is a school or a hospital, the distance threshold is smaller.

In the present embodiment, it is feasible to obtain the travel manner, the query starting point, the query finishing point and the destination provided by the user, and then perform navigation map-based first travel manner path planning, according to the travel manner, the query starting point and the query finishing point so that it is feasible to perform real-scenario image-based second travel manner path planning, according to the query finishing point and the destination, if the user reaches the query finishing point and a distance between the query finishing point and the destination is smaller than or equal to a preset distance threshold. Since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, thereby improving navigation efficiency and reliability.

In addition, when the technical solution according to the present disclosure is employed, since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, which can effectively avoid the technical problem in the prior art that data interaction between the application and the query engine increases because the application repeatedly performs query operations, and thereby reduce the processing burden of the query engine.

In addition, the technical solution according to the present disclosure can be employed to effectively improve the user's experience.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
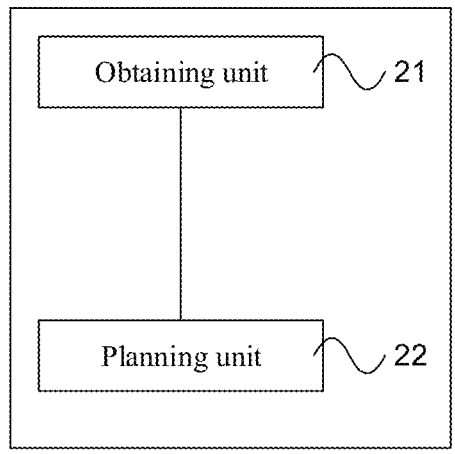
FIG. 2 is a structural schematic diagram of a real scenario navigation apparatus according to another embodiment of the present disclosure.

FIG. 2 is a structural schematic diagram of a real scenario navigation apparatus according to another embodiment of the present disclosure. As shown in FIG. 2, the real scenario navigation apparatus of the present embodiment may include an obtaining unit 21 and a planning unit 22, wherein the obtaining unit 21 is configured to obtain a travel manner, a query starting point, a query finishing point and a destination provided by a user; the planning unit 22 is configured to perform navigation map-based first travel manner path planning, according to the travel manner, the query starting point and the query finishing point; the planning unit 22 is further configured to, if the user reaches the query finishing point and a distance between the query finishing point and the destination is smaller than or equal to a preset distance threshold, perform real-scenario image-based second travel manner path planning, according to the query finishing point and the destination.

It needs to be appreciated that all or part of the real scenario navigation apparatus according to the present embodiment may be an application located at a local terminal, or a function unit such as a plug-in or Software Development Kit (SDK) arranged in the application located at the local terminal, or a query engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the first travel manner comprises cycling, public transport, subway or self drive; the second travel manner comprises walling on foot or cycling. This is not particularly limited in the present embodiment.

Optionally, in a possible implementation mode of the present embodiment, the planning unit 22 may be specifically configured to use an image-collecting device to collect real-scenario images around a location where the user lies; perform navigation map-based second travel manner path planning, according to the query finishing point and the destination; output a planning result of the second travel manner path planning based on the real-scenario images around the location where the user lies.

In this implementation mode, the planning result of the navigation map-based second travel manner path planning according to the query finishing point and the destination may include but not limited to at least one of the following information:

direction indication information indicating the current travel direction, for example, travel straight forward, turn left or turn right; and distance indication information indicating a distance between the location where the user lies and the destination and/or time indication information indicating time between the location where the user lies and the destination, for example, X X meters left in the whole trip, need to spend X X minutes.

In a possible implementation mode of the present embodiment, the planning unit 22 may be specifically configured to output the planning result of the second travel manner path planning in a speech manner and/or a text manner based on real-scenario images around the location where the user lies.

Optionally, in a possible implementation mode of the present embodiment, the planning unit 22 may be further configured to preset the distance threshold according to attribute information of the destination.

It needs to be appreciated that the method in the embodiment corresponding to FIG. 1 may be implemented by the real scenario navigation apparatus provided in the present embodiment. For detailed description, please refer to relevant content in the embodiment corresponding to FIG. 1, and no detailed description will be presented any longer.

In the present embodiment, the obtaining unit obtains the travel manner, the query starting point, the query finishing point and the destination provided by the user, and then the planning unit performs navigation map-based first travel manner path planning, according to the travel manner, the query starting point and the query finishing point so that the planning unit can perform real-scenario image-based second travel manner path planning, according to the query finishing point and the destination, if the user reaches the query finishing point and a distance between the query finishing point and the destination is smaller than or equal to a preset distance threshold. Since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, thereby improving navigation efficiency and reliability.

In addition, when the technical solution according to the present disclosure is employed, since the navigation operations are performed not completely depending on the query end points, namely, the query starting point and the query finishing point any more, and the navigation operations are performed in conjunction with the destination additionally provided by the user, the obtained navigation information can substantially satisfy the user's travel intention, namely, the user, after reaching the query finishing point, needs to further switch to another travel manner to go to the destination, which can effectively avoid the technical problem in the prior art that data interaction between the application and the query engine increases because the application repeatedly performs query operations, and thereby reduce the processing burden of the query engine.

In addition, the technical solution according to the present disclosure can be employed to effectively improve the user's experience.

Figure 3:
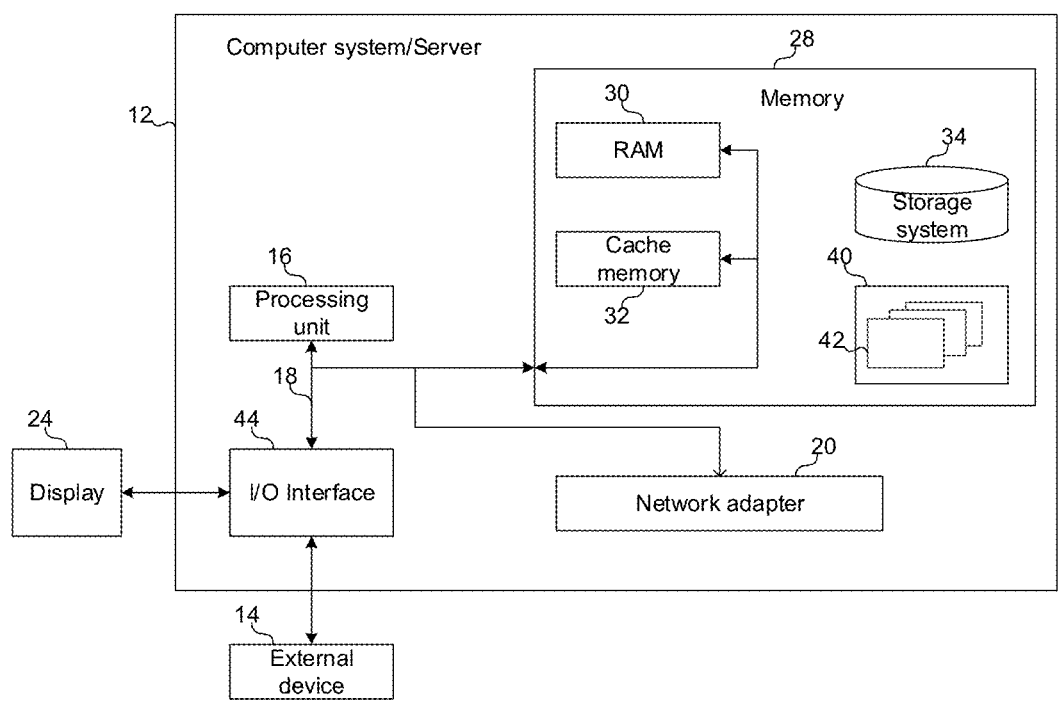
FIG. 3 illustrates a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the real scenario navigation method provided by the embodiment corresponding to FIG. 1.

Another embodiment of the present disclosure further provides a computer-readable storage medium on which a computer program is stored. The program, when executed by a processor, can implement the real scenario navigation method provided by the embodiment corresponding to FIG. 1.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A real scenario navigation method, wherein the method comprises:
    obtaining a travel manner, a query starting point, a query finishing point and a destination provided by a user;
    performing navigation map-based first travel manner path planning, according to the travel manner, the query starting point and the query finishing point;
    if the user reaches the query finishing point and a distance between the query finishing point and the destination is smaller than or equal to a preset distance threshold, performing real-scenario image-based second travel manner path planning, according to the query finishing point and the destination,
    wherein the performing real-scenario image-based second travel manner path planning, according to the query finishing point and the destination comprises:
    using an image-collecting device to collect real-scenario images around a location where the user lies;
    performing navigation map-based second travel manner path planning, according to the query finishing point and the destination; and
    outputting a planning result of the second travel manner path planning based on the real-scenario images around the location where the user lies.

2. The method according to claim 1, wherein the first travel manner comprises cycling, public transport, subway or self drive; the second travel manner comprises walking on foot or cycling.

3. The method according to claim 1, wherein the planning result of the second travel manner path planning comprises at least one of the following information:
    direction indication information indicating the current travel direction; and
    distance indication information indicating a distance between the location where the user lies and the destination and/or time indication information indicating time between the location where the user lies and the destination.

4. The method according to claim 1, wherein the outputting a planning result of the second travel manner path planning based on the real-scenario images around the location where the user lies comprises:
    outputting the planning result of the second travel manner path planning in a speech manner and/or a text manner based on real-scenario images around the location where the user lies.

5. The method according to claim 1, wherein before the step of, if the user reaches the query finishing point and a distance between the query finishing point and the destination is smaller than or equal to a preset distance threshold, performing real-scenario image-based second travel manner path planning, according to the query finishing point and the destination, the method further comprises:
    presetting the distance threshold according to attribute information of the destination.

6. A device, wherein the device comprises:
    one or more processors;
    a storage for storing one or more programs,
    said one or more programs, when executed by said one or more processors, enable said one or more processors to implement a real scenario navigation method, wherein the method comprises:

obtaining a travel manner, a query starting point, a query finishing point and a destination provided by a user;

performing navigation map-based first travel manner path planning, according to the travel manner, the query starting point and the query finishing point;

if the user reaches the query finishing point and a distance between the query finishing point and the destination is smaller than or equal to a preset distance threshold, performing real-scenario image-based second travel manner path planning, according to the query finishing point and the destination, wherein the performing real-scenario image-based second travel manner path planning, according to the query finishing point and the destination comprises:

using an image-collecting device to collect real-scenario images around a location where the user lies;

performing navigation map-based second travel manner path planning, according to the query finishing point and the destination; and outputting a planning result of the second travel manner path planning based on the real-scenario images around the location where the user lies.

7. The device according to claim 6, wherein the first travel manner comprises cycling, public transport, subway or self drive; the second travel manner comprises walking on foot or cycling.

8. The device according to claim 6, wherein the planning result of the second travel manner path planning comprises at least one of the following information:

direction indication information indicating the current travel direction; and distance indication information indicating a distance between the location where the user lies and the destination and/or time indication information indicating time between the location where the user lies and the destination.

9. The device according to claim 6, wherein the outputting a planning result of the second travel manner path planning based on the real-scenario images around the location where the user lies comprises:

outputting the planning result of the second travel manner path planning in a speech manner and/or a text manner based on real-scenario images around the location where the user lies.

10. The device according to claim 6, wherein before the step of, if the user reaches the query finishing point and a distance between the query finishing point and the destination is smaller than or equal to a preset distance threshold, performing real-scenario image-based second travel manner path planning, according to the query finishing point and the destination, the method further comprises:

presetting the distance threshold according to attribute information of the destination.

11. A non-transitory computer readable storage medium on which a computer program is stored, wherein the program, when executed by a processor, implements a real scenario navigation method, wherein the method comprises:

obtaining a travel manner, a query starting point, a query finishing point and a destination provided by a user;

performing navigation map-based first travel manner path planning, according to the travel manner, the query starting point and the query finishing point;

if the user reaches the query finishing point and a distance between the query finishing point and the destination is smaller than or equal to a preset distance threshold, performing real-scenario image-based second travel manner path planning, according to the query finishing point and the destination, wherein the performing real-scenario image-based second travel manner path planning, according to the query finishing point and the destination comprises:

using an image-collecting device to collect real-scenario images around a location where the user lies;

performing navigation map-based second travel manner path planning, according to the query finishing point and the destination; and outputting a planning result of the second travel manner path planning based on the real-scenario images around the location where the user lies.

12. The non-transitory computer readable storage medium according to claim 11, wherein the first travel manner comprises cycling, public transport, subway or self drive; the second travel manner comprises walking on foot or cycling.

13. The non-transitory computer readable storage medium according to claim 11, wherein the planning result of the second travel manner path planning comprises at least one of the following information:

direction indication information indicating the current travel direction; and distance indication information indicating a distance between the location where the user lies and the destination and/or time indication information indicating time between the location where the user lies and the destination.

14. The non-transitory computer readable storage medium according to claim 11, wherein the outputting a planning result of the second travel manner path planning based on the real-scenario images around the location where the user lies comprises:

outputting the planning result of the second travel manner path planning in a speech manner and/or a text manner based on real-scenario images around the location where the user lies.

15. The non-transitory computer readable storage medium according to claim 11, wherein before the step of, if the user reaches the query finishing point and a distance between the query finishing point and the destination is smaller than or equal to a preset distance threshold, performing real-scenario image-based second travel manner path planning, according to the query finishing point and the destination, the method further comprises:

presetting the distance threshold according to attribute information of the destination.

* * * * *